(12) United States Patent
Croxford

(10) Patent No.: US 10,861,243 B1
(45) Date of Patent: Dec. 8, 2020

(54) CONTEXT-SENSITIVE AUGMENTED REALITY

(71) Applicant: Apical Limited, Cambridge (GB)

(72) Inventor: Daren Croxford, Cambridge (GB)

(73) Assignee: Apical Limited, Cambridge (GB)

(*) Notice: Subject to any disclaimer, the term of this patent is extended or adjusted under 35 U.S.C. 154(b) by 0 days.

(21) Appl. No.: 16/428,787

(22) Filed: May 31, 2019

(51) Int. Cl.
*G06T 19/00* (2011.01)
*G06T 7/20* (2017.01)
*G06T 7/70* (2017.01)

(52) U.S. Cl.
CPC .......... *G06T 19/006* (2013.01); *G06T 7/20* (2013.01); *G06T 7/70* (2017.01); *G06T 2207/20084* (2013.01); *G06T 2207/30192* (2013.01)

(58) Field of Classification Search
CPC .................................................. G06T 19/006
USPC ............................................................ 345/633
See application file for complete search history.

(56) References Cited

U.S. PATENT DOCUMENTS

| | | | | |
|---|---|---|---|---|
| 10,088,678 B1* | 10/2018 | Copic | .................. | G01W 1/10 |
| 2009/0128552 A1* | 5/2009 | Fujiki | .................. | G06T 19/006 |
| | | | | 345/419 |
| 2013/0328925 A1* | 12/2013 | Latta | .................. | G06F 3/013 |
| | | | | 345/633 |
| 2014/0184496 A1* | 7/2014 | Gribetz | ............... | G06F 3/04842 |
| | | | | 345/156 |
| 2016/0026253 A1* | 1/2016 | Bradski | .............. | G02B 27/0172 |
| | | | | 345/8 |
| 2016/0217612 A1* | 7/2016 | Petill | ..................... | G06T 19/006 |
| 2017/0061700 A1* | 3/2017 | Urbach | ................ | H04N 13/344 |
| 2017/0109931 A1* | 4/2017 | Knorr | ..................... | G06T 7/11 |
| 2018/0173300 A1* | 6/2018 | Schwarz | ................ | G06F 3/011 |
| 2019/0004325 A1* | 1/2019 | Connor | .................. | G02B 30/35 |
| 2019/0094981 A1* | 3/2019 | Bradski | .................. | G02B 30/26 |
| 2019/0102946 A1* | 4/2019 | Spivack | .................. | G06F 3/013 |
| | | | | 345/633 |
| 2020/0035028 A1* | 1/2020 | Cornell | .................... | G01S 7/04 |

* cited by examiner

*Primary Examiner* — David T Welch
(74) *Attorney, Agent, or Firm* — EIP US LLP

(57) ABSTRACT

A method for producing a context-sensitive augmented reality output comprising the steps of obtaining an output of an image sensor, wherein the output is representative of a real-world environment. Environmental data associated with the real-world environment is then obtained and analyzed to determine at least one environmental characteristic. At least one virtual object is then modified based on the at least one environmental characteristic derived from the environmental data. The modified virtual object is then inserted into the output of the image sensor to produce a modified output; which is then displaying on a display.

16 Claims, 4 Drawing Sheets

CONTEXT-SENSITIVE AUGMENTED REALITY

BACKGROUND OF THE INVENTION

Field of the Invention

The present invention relates to image processing, particularly in relation to augmented reality and mixed reality applications.

Description of the Related Technology

Processing image data in relation to augmented reality applications involves determining where to position or anchor virtual objects and other augmented reality components. In augmented reality applications, this can involve determining locations of where to render one or more virtual objects in relation to real-world objects in the physical environment.

Accurately integrating one or more virtual objects within the physical environment is a challenge. Furthermore, ensuring a seamless interaction between the virtual objects and real-world objects is also a challenge.

SUMMARY

According to a first aspect of the present invention, there is provided a method comprising the steps of obtaining an output of an image sensor, wherein the output is representative of a real-world environment; obtaining environmental data associated with the real-world environment; analyzing the environmental data to determine at least one environmental characteristic; modifying at least one virtual object based on the at least one environmental characteristic derived from the environmental data; preparing the at least one modified virtual object for display; and displaying the modified output on a display.

According to a second aspect of the present invention, there is provided a device comprising an image sensor for capturing a representation of a real-world environment; a display controller for outputting the representation to a display; and at least one processor for obtaining environmental data associated with the real-world environment; the processor comprising: an analysis module for analyzing the environmental data to determine at least one environmental characteristic; a modification module for generating a modified object based on the at least one environmental characteristic; and a display module for inserting the modified object into the representation of the real-world environment captured by the image sensor and providing the modified representation to the display controller for outputting to the display.

According to a third aspect of the present invention, there is provided a non-transitory computer readable storage medium comprising a set of computer-readable instructions stored thereon which, when executed by at least one processor, cause the at least one processor to: obtain an output of an image sensor, wherein the output is representative of a real-world environment; obtain environmental data associated with the real-world environment; analyze the environmental data to determine at least one environmental characteristic; modify at least one virtual object based on the at least one environmental characteristic derived from the environmental data; preparing the at least one modified virtual object for display; and display the modified output on a display.

BRIEF DESCRIPTION OF THE DRAWINGS

Further features and advantages of the invention will become apparent from the following description of preferred embodiments of the invention, given by way of example only, which is made with reference to the accompanying drawings in which like reference numerals are used to denote like features.

DETAILED DESCRIPTION OF CERTAIN INVENTIVE EMBODIMENTS

Augmented reality and mixed reality systems often feature computing devices, such devices comprising data storage and one or more processors for executing computer-executable instructions within the storage. The one or more processors may include a central processing unit (CPU), a graphics processing unit (GPU), a neural processing unit (NPU), and/or other processors which may be combined as a System on Chip (SoC) or onto multiple SoCs to form one or more application processors.

In an example, an augmented reality (AR) engine is provided on a computing device. The AR engine may be in the form of one or more software and/or hardware modules. The AR engine may, for example, be part of an AR platform or operating system, such as Apple ARKit™, Google ARCore™, or Google Tango™ installed on the computing device.

The computing device may function as part of an AR system comprising multiple user devices. The multiple user devices may experience, via an AR system, an augmented reality experience shared between them. The computing device may, in some examples, be one or more of the user devices.

One or more of the devices may be in the form of a general-purpose smartphone or general-purpose tablet computing device, such as an Android™ or Apple iOS™ device. In some examples, the one or more devices may be removably mounted to a corresponding separate headset. In other examples, one or more of the devices may be in the form of an augmented reality headset or augmented reality glasses, which can be worn by a user. Further examples may combine multiple devices, such as a head mounted display and a separate computing device, for example a general-purpose smartphone. The head mounted display may rely on processing undertaken by the smartphone. That is, the head mounted display may capture an image and undertake some processing, however it would be communicably coupled to the smartphone, which performs further processing. In yet further examples, the smartphone may then offload some additional processing to a remote device if required.

Figure 1:
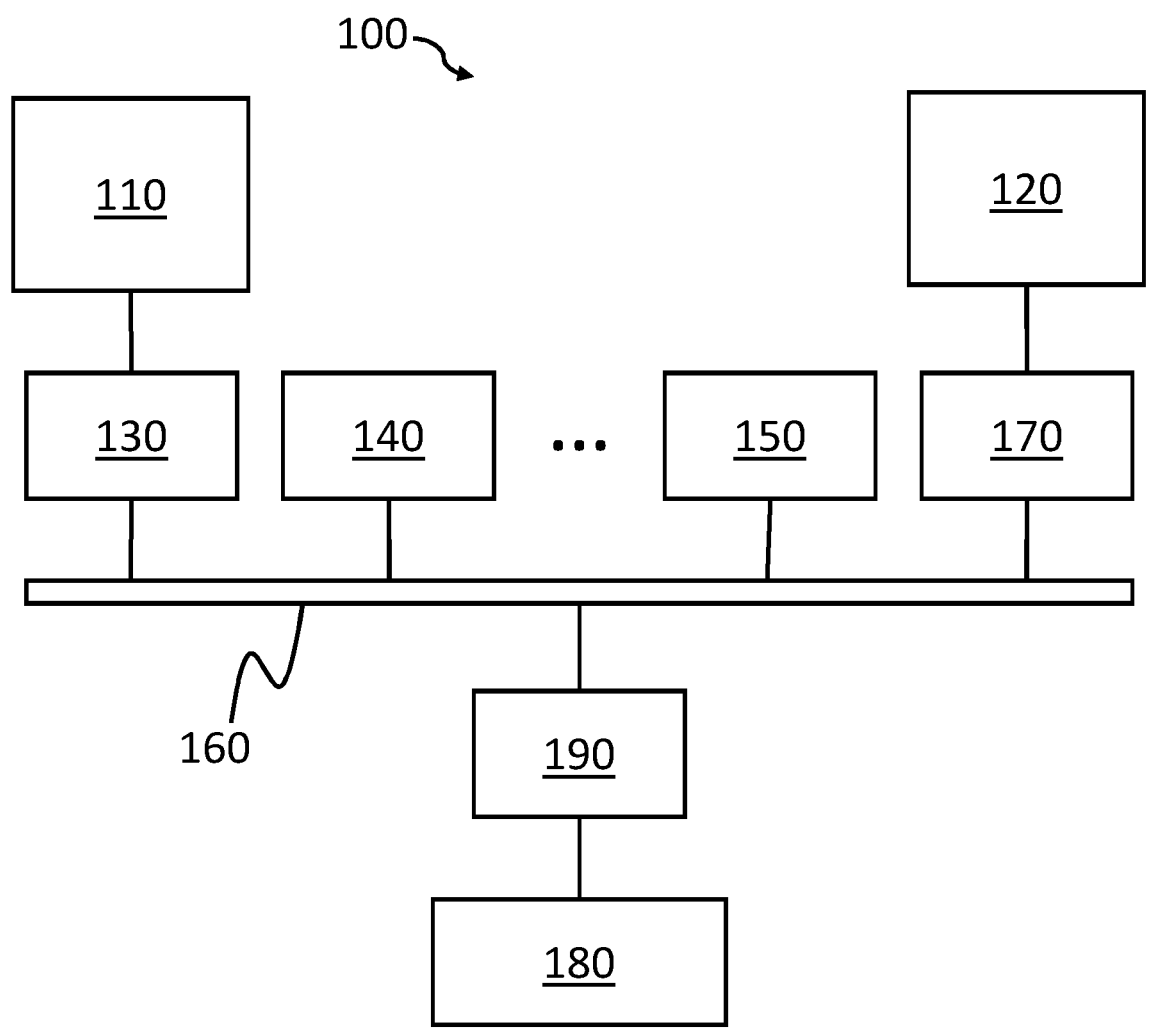
FIG. 1 shows schematically a system according to a first example.

FIG. 1 shows, schematically, a device 100 such as the one described above. The device 100 may be provided with one or more image sensors 110. The device 100 may thus capture images of a real-world environment using the respective image sensors 110 which are provided to a display 120 of the device 100 via an image signal processor 130. The images may depict a field-of-view of the real-world environment that is capturable by the device 100. The images may be augmented to include virtual objects and features before being provided to the display 120.

The device 100 may comprise one or more other processors such as an NPU 140 and CPU 150 for example. One or more of the processors 130, 140, 150 may be interconnected using system bus 160. Furthermore, a display controller 170 is connected to a display 120 and may also be connected to the system bus 160. This allows data to be transferred between the various components. The system bus 160 may be or include any suitable interface or bus. For example, an ARM® Advanced Microcontroller Bus Architecture (AMBA®) interface, such as the Advanced eXtensible Interface (AXI), may be used.

The device 100 also comprises memory 180 for storing the images captured by the image sensor 110, accessed via a memory controller 190 connected to the system bus 160. The memory may also be arranged to store other information for use by the device 100 in generating the augmented reality environment.

The memory controller 190 may comprise a dynamic memory controller (DMC). The memory controller 190 is coupled to a memory 180. The memory controller 190 is configured to manage the flow of data going to and from the memory 180. The memory 180 may comprise a main memory, otherwise referred to as a "primary memory". The memory 180 may be an external memory, in that the memory 180 is external to the device 100. For example, the memory 180 may comprise 'off-chip" memory. The memory 180 may have a greater storage capacity than the memory cache(s) of the NPU 140 and/or the CPU 150. In some examples, the memory 180 is comprised in the device 100. For example, the memory 180 may comprise 'on-chip' memory. The memory 180 may, for example, comprise a magnetic or optical disk and disk drive or a solid-state drive (SSD). In some examples, the memory 180 comprises a synchronous dynamic random-access memory (SDRAM). For example, the memory 180 may comprise a double data rate synchronous dynamic random-access memory (DDR-SDRAM). The memory 180 may be arranged to store image data corresponding to one or more images, each image corresponding to a different frame in a video. The stored image data may correspond to successive images in a video stream. The memory 180 may comprise a frame buffer arranged to store the image data.

The CPU 150 may comprise an image or video processor configured to process image or video data. The CPU 150 may be equipped with various image processing-related functionality. For example, the CPU 150 may be configured to perform object detection and/or recognition tasks, computer vision tasks, etc. The CPU 150 may be configured to obtain image data from the memory 180, or via an ISP 130 coupled to one or more sensors 120. The CPU 150 is configured to output processed data to the memory 180 via the system bus 160 and memory controller 190.

The NPU 140 may be a neural network accelerator and include an interface via which inputs to a neural network may be received. The NPU 140 may be configured to obtain image data from the memory 180, or via an ISP 130 coupled to one or more sensors 120. The NPU 140 is a processor dedicated to implementing the classification of data using a neural network trained on a training set of data. For example, the neural network of the invention may be used for detecting environmental characteristics, as will be described in greater detail below, and may have been trained on a data set comprising a plurality of examples of different environmental characteristics, such as bodies of water, wind directions and magnitudes, and other weather conditions such as rain, snow and hail.

The device may also comprise other processors, such as a GPU (not shown) that is configured to process image or video data. The GPU may comprise a greater number of cores or processing units than the number of cores in the CPU 150. Each of the cores of the GPU may, individually, be relatively slow and/or unsophisticated compared to any of the cores of the CPU 150. A given core of the GPU may, therefore, be less suitable for performing complex computational tasks compared with a given core of the CPU 150. However, the relatively large number of cores in the GPU enables certain computational tasks, for example, tasks with a relatively high degree of parallelism, to be performed more efficiently by the GPU than by the CPU 150 since a relatively large number of processes may be carried out in parallel by the GPU. Examples of image-related computational tasks that may be performed more efficiently by the GPU than by the CPU 150 include, but are not limited to, image rendering processes such as texture mapping, rendering polygons, shading, geometric calculations and motion compensation. The GPU may also be used to perform tasks that are not image-related, for example executing a neural network. The GPU may be configured to obtain image data from the memory 180. In some examples, the GPU obtains image data directly from the CPU or a further processing unit (not shown) such as an ISP 130. The GPU is configured to process the image data, for example, to generate a rendered image, and to output the generated data to the memory 180 via the system bus 160 and memory controller 190. For example, the generated data may be stored in a framebuffer.

The device may comprise a display 120. Examples of displays include but are not limited to, head-mounted displays (HMDs), monitors, televisions, display panels and wearable display equipment. The display 120 may be arranged remotely from the device 100. The display 120 and the device 100 may be arranged in separate physical housings in some examples. In other examples, the display 120 and the device 100 are comprised in the same physical housing.

The display 120 is couplable to the other components of the device 100 via a display controller 170. The display controller 170 may be referred to as a "display link". The display interface 170 may comprise a display serial interface (DSI). A DSI is an interface via which image or video data can be streamed to a display. The DSI may define a serial bus and a communication protocol between a source of image data and a destination of image data. The display controller 170 may comprise a display parallel interface (DPI). The display interface 170 may comprise an interface that is configured as an interconnect for streaming image or video data. The display controller 170 may comprise one high-speed clock lane and one or more data lanes. Examples of suitable display interfaces include, but are not limited to, MIPI DSI, DisplayPort™, embedded DisplayPort™, Mobile High-Definition Link (MHL), High-Definition Multimedia Interface (HDMI), etc. In some examples, the display controller 170 is configured to carry multiple images or video streams. The display controller 170 may have a predetermined bandwidth or data rate limit. The bandwidth or data rate limit may determine the maximum rate at which image or video data can be transmitted via the display controller 170.

The display controller 170 may comprise a display controller which may be referred to as a "display processor". The display controller 170 may comprise a video shifter. The display controller may be configured to obtain an image or video data from the memory 180, e.g. via the bus 160. In some cases, the display controller 170 is configured to receive an image or video data directly from the NPU 140, CPU 150, or from the ISP 130, i.e. without the image data having first been stored in and retrieved from the memory 180. It will be appreciated that the display controller may be configured to receive image or video data from other processors, such as a GPU. The display controller 170 may be configured to process the obtained image or video data and generate a serial bitstream. A serial bitstream is a sequence of bits. The generated serial bitstream may then be used to output an image or video signal. The serial bitstream may be output for transmission via the display controller 170 to the display device 120. In some examples, the display controller 170 is responsible for video timing signals. Video timing signals may be used to synchronize component video data. Component video data is video data that is split into two or more component channels. For example, video data may be split into separate color channels. The display controller 170 may be configured with various other image or video processing functionality. For example, the display controller may be configured with upscaling and/or downscaling functionality, and in some examples compositing functionality.

The display 120 may be a transparent head mounted display, such that the user will be able to directly see the scene, and objects inserted into the field of view of the user on the transparent scene. In other examples, the display 120 may form part of a computing device, such as a mobile telephone, where the display 120 is opaque. In such examples, images of the real-world environment are combined and composited together with virtual objects, and then shown on the opaque display 120. The compositing of the images may be performed by one or more processors forming part of the system 100, such as an image processor or GPU.

Figure 2:
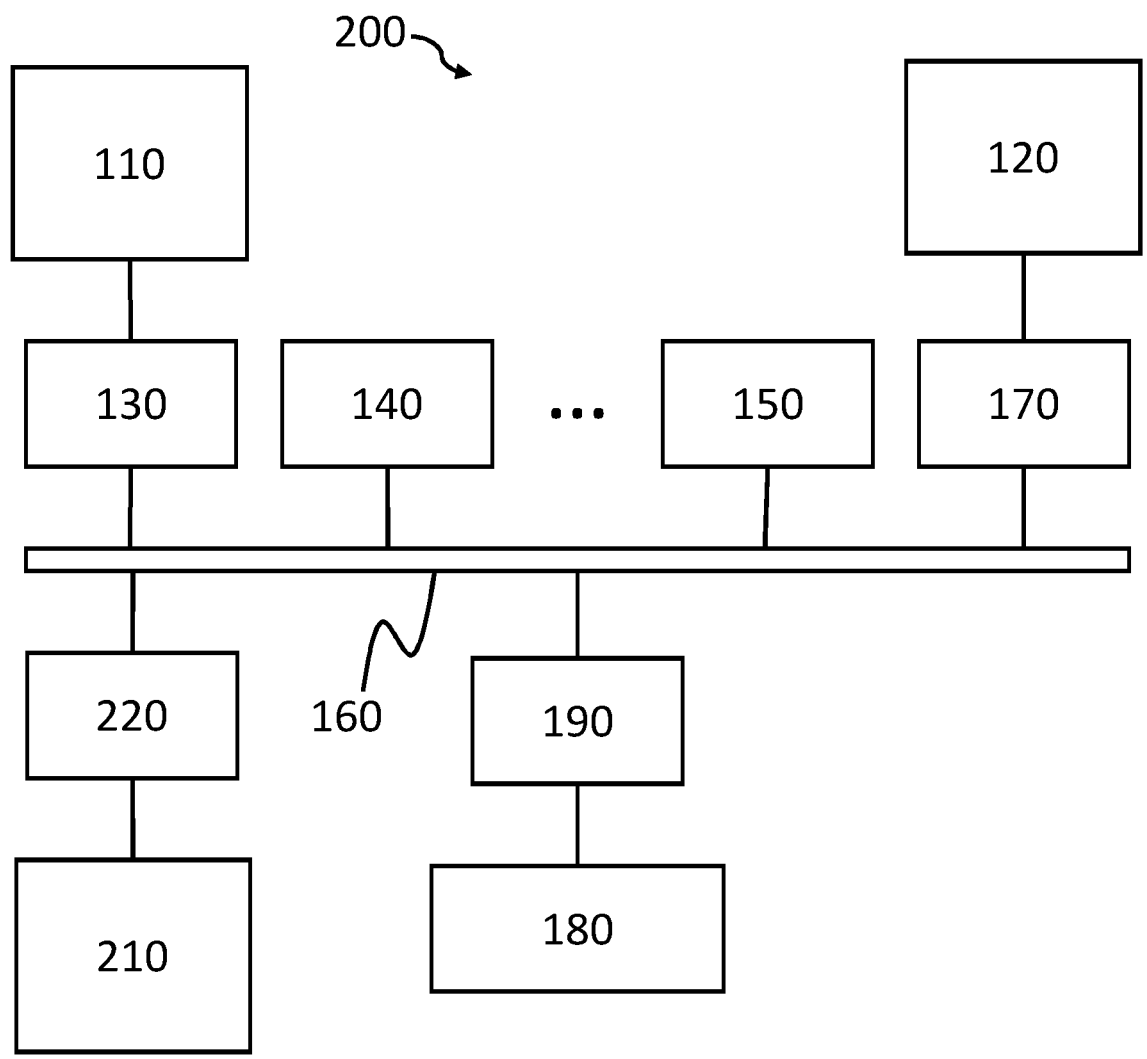
FIG. 2 shows schematically a system according to a second example.

FIG. 2 shows, schematically, an alternative user device 200 according to the invention. The user device 200 comprises many of the same components 110-190 of the user device 100 described above in relation to FIG. 1. The user device 200 comprises a depth or time of flight sensor 210 for determining the depth of real-world objects in the real-world environment. The depth sensor 210 is connected to a depth processor 220 which is arranged to analyze the depth information gathered by the depth sensor 210. The analyzed information is made available to other components of the user device 200 via the system bus 160 which is connected to the depth processor 220. It will be appreciated that the user device 200 may also comprise other sensors such as a microphone.

Figure 3:
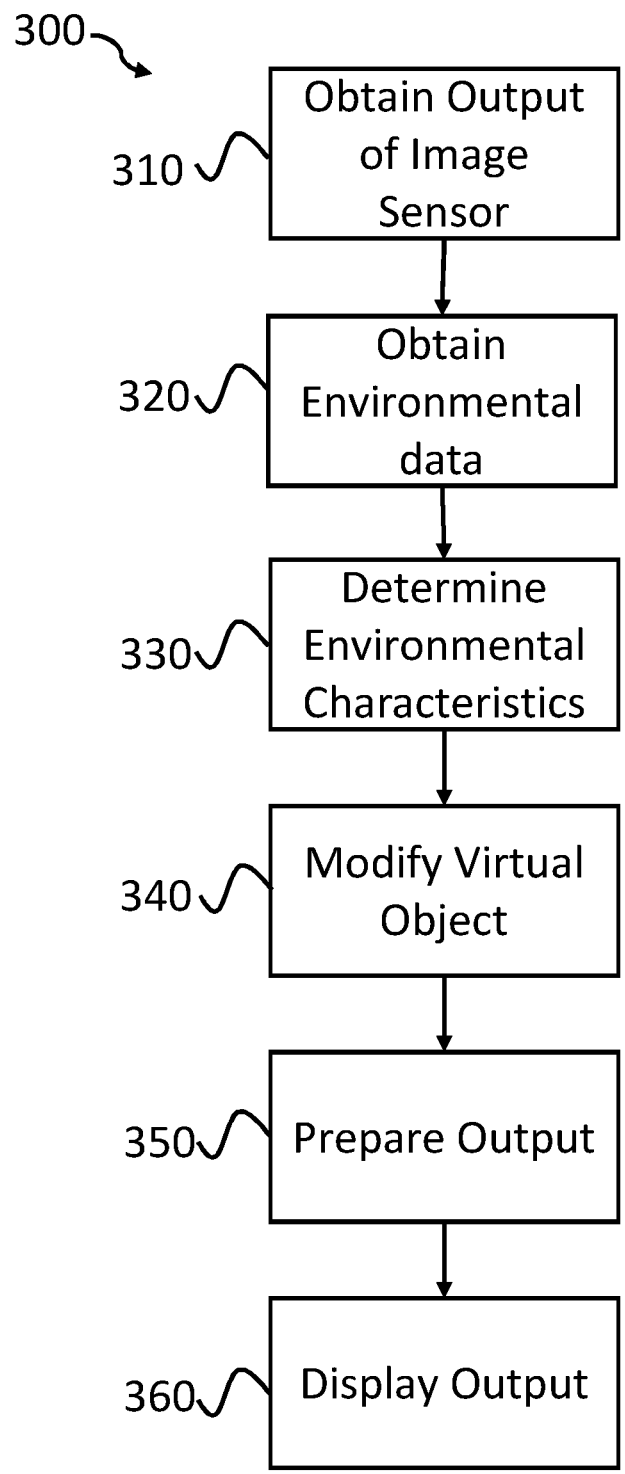
FIG. 3 is a flow diagram showing a method according to examples.

FIG. 3 is a flowchart showing a method 300 according to the invention, in particular, a method 300 which may be executed on a device such as devices 100, 200 described above in relation to FIGS. 1 and 2.

At item 310, the output of an image sensor, such as the image sensor 110 discussed above in relation to the devices 100, 200 described in relation to FIGS. 1 and 2. The output of the image sensor may comprise one or more images representing a real-world environment that is capturable by the device. Once the output of the image sensor has been obtained, the method progresses to item 320.

At item 320, environmental data is obtained from the output of the image sensors, and in some examples the output of other sensors associated with the user device. For example, environmental data may be obtained based on the output of a depth sensor as described above in relation to FIG. 2, or other sensors, such as an accelerometer, barometer, humidity sensor or any other suitable sensor.

The output of the sensors may contain a number of pieces of environmental information, for example, when an image sensor is used, the movement of objects in a sequence of images output by the image sensor may be used to determine a wind direction and magnitude. In addition to, or instead of determining a wind direction and magnitude, the environmental data obtained from the output of the sensors may include information associated with weather conditions, such as rain, hail or snow, determining the position of a light source within the field-of-view captured of a real-world environment captured by the sensor, and/or the locations of bodies of water and other objects within the field-of-view. The environmental information may, in some examples, refer only to a portion or predefined region of an output. In examples where the environmental information relates only to a portion or predefined region of an output, the environmental information determined may also differ. The environmental information may in one portion relate to determining the wind direction and magnitude, whereas in another portion the environmental information may relate to the position of a light source, as described below in relation to FIGS. 4a-4c. Furthermore, portions may be used to determine multiple pieces of environmental information, or multiple portions may be used to determine environmental information which is different from the environmental information based on another portion of the output. The environmental information may also be based on a plurality of sensing devices, for example, a time-of-flight or depth sensor may be used to help determine the distance of a real-world object within the field of view of the sensor from the sensor itself. This information can be used to construct a three-dimensional environment such that virtual object are able to be placed in front of, or behind real-world objects, or such that the virtual object can be partially or fully obscured when needed.

The environmental information may be a series of frames of image data or the output from another sensor associated with a device captured over a period of time. Once this information has been obtained from the output of the sensor, the method progresses to item 330 where one or more environmental characteristics are determined.

The environmental characteristics are derived from the environmental information obtained from the output of the sensors. The environmental information may be processed by one or more neural network processors, such as a neural network processing unit 140 associated with either devices 100, 200 described above in relation to FIGS. 1 and 2. To determine one or more environmental characteristics associated with the environmental information, the method may use one or more neural networks, such as a convolutional neural network may be used to analyze the environmental information. The NPU may be arranged to process a neural network algorithm for determining a wind direction. This neural network will analyze the environmental data obtained from the output of the image sensor over a particular period of time and determine where in the environmental information, data associated with a wind direction can be obtained. In some examples, the neural network may only analyze a single static image to determine this information. This process will be described in more detail below in relation to FIGS. 4a-4c. The NPU may also be arranged to process other neural network algorithms, such as for determining the direction of a light source, a magnitude of wind, whether it is raining, snowing or hailing, or in some examples determine multiple environmental characteristics. Other neural networks algorithms may also be used to determine features of a landscape within the output of the image sensor, such as being able to determine whether there is a body of water within the field-of-view of the sensor, this may be obtained using image data from the image sensor or depth information obtained from one or more other sensors associated with the system.

The output of the neural network algorithms may then be used to generate meta data indicating the different environmental characteristics from one or more regions for the scene. For example, where wind direction and magnitude are determined for a plurality of regions of the scene, meta data indicating the direction and magnitude for each of the areas would be generated.

Once the modifications to apply to the virtual object have been determined, the method moves to item 340. At item 340, a virtual object is retrieved from memory, the virtual object is then modified, which may be undertaken by the CPU or another processing unit. The virtual object is modified based on the meta data generated by the neural network at item 330, such that the look and behavior of the virtual object is what would be expected in light of the environmental characteristics of the scene. Once modified the virtual object may then be rendered by another processing unit such as the GPU. The modifications may apply to the virtual object itself or alternatively, they may apply to the interaction the virtual object has with real-world objects in the field-of-view of the sensors. For example, if a virtual object is placed within the field-of-view of the sensor such that it is positioned on a body of water, the virtual object will be modified such that upon placement it behaves as would be expected of a real-world object interacting with the body of water. If the virtual object was a boat, for example, it may be modified such that it floats on the surface of the body of water, whereas if the virtual object was a rock it may be modified such that on placement, it sinks. In yet another example, where the output of the neural networks indicate that it is currently raining in the real-world environment, the textures applied to the virtual object may be modified, such that it appears that the virtual object is wet. Other information may also be used, for example, depth information obtained by a depth or time-of-flight sensor, to ensure that the virtual object interacts as expected with the real-world environment. Such interactions may include obscuring portions of the virtual object when real-world object move in front of the virtual object.

Once the modifications have been made to the virtual object, the method progresses to item 350 where the modified virtual object is prepared to be output. The preparation undertaken may be dependent on the type of display use. For example, where the display is transparent, preparing the output may involve converting the modified virtual object into an object capable of being displayed on a transparent display. Where the display is an opaque display, the modified virtual object may be inserted into the output captured by the sensor. The modified virtual object may be adjusted differently in different frames of the output of the sensor. For example, where the virtual object is affected by the wind, when output, the virtual object may be modified such that it appears animated within the real-world environment.

After the modified virtual object has been inserted into the output of the sensor, the output containing the virtual object is provided to a display device, such as the display 120 described above in relation to FIGS. 1 and 2.

Figure 4A:
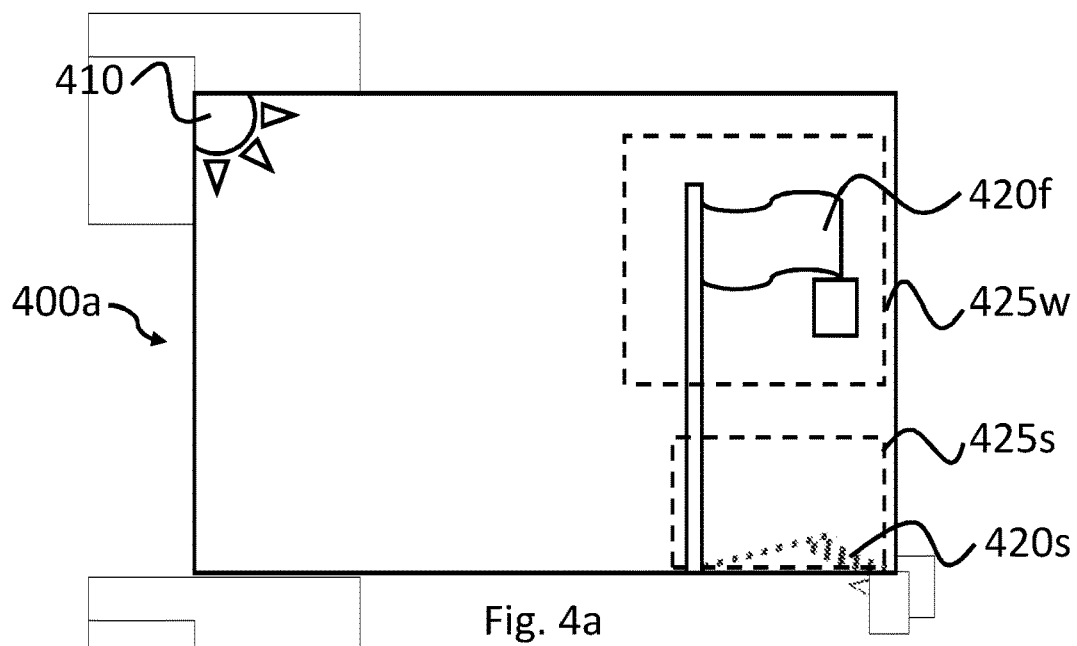
FIG. 4a shows schematically an output of an image sensor according to the method of FIG. 3.
Figure 4B:
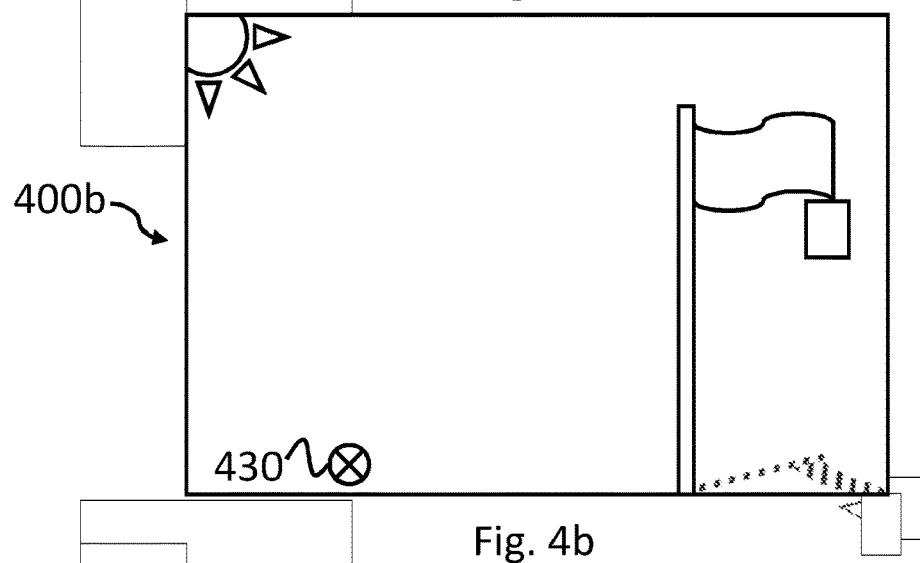
FIG. 4b shows schematically an output showing an intermediary step of the method according to FIG. 3.
Figure 4C:
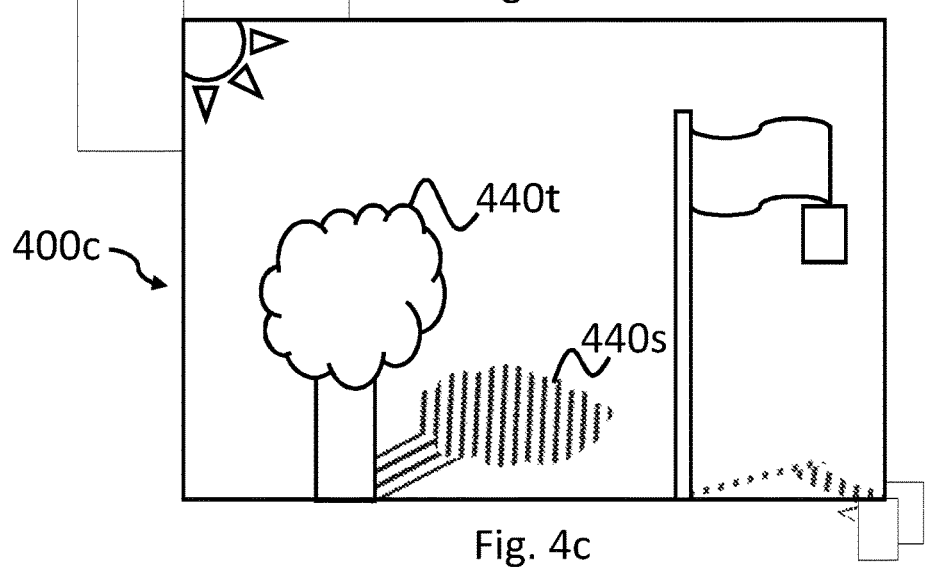
FIG. 4c shows schematically an output comprising a modified virtual object according to the method of FIG. 3.

FIGS. 4a-4c show schematically outputs which are presented on a display (not shown) of a device, such as for showing on display 120 of devices 100 and 200 shown in FIGS. 1 and 2.

FIG. 4a shows the output 400a shown on a display. The output 400a is representative of a field-of-view of an image sensor which is shown on a display of a device. The field-of-view of the image sensor contains a light source, in this example the sun 410, and an object, in this example a flag on a flag pole 420f. The flag on the flagpole 420f is affected by environmental conditions such that it moves in the wind and has a shadow. An NPU associated with the device, such as NPU 140 of device 100, 200 described above in relation to FIGS. 1 and 2, determines an area 425w associated with an environmental condition. In this example, the NPU analyses the output 400a and detects the movement of the flag on the flagpole 420f. This movement is input into a neural network arranged to detect a wind direction and determine the magnitude of the wind. The NPU may also determine one or more other environmental conditions associated with the output 400a. In this example, the NPU detects that there is a light source 410 in the output 400a, and determines that the direction of the light source 410 may be determined from the shadows of objects in the output 400a. The NPU analyses the output 400a and determines that the shadow 420s of the flag on the flagpole 420f is indicated by the area 425s. This area is input into a neural network which is arranged to detect a light direction. The NPU may analyze a plurality of other environmental conditions, such as rain, hail, snow, and the detection of features within the output 400a, such as a body of water. The neural networks may operate on the NPU in parallel, in order to provide a more streamlined and efficient detection of environmental features.

FIG. 400b shows the output 400b of a second stage of a process according to the method set out above in relation to FIG. 3. A user and/or other system associated with the augmented or mixed reality device selects a point 430 at which to insert a virtual object. The point 430 is an anchor point at which a virtual object is to be placed, such that when the device moves, the object appears to be in the place it would be expected to be in relation to the movement of the device. This provides the illusion that the virtual object is present in the field-of-view of the image sensor producing the output 400b.

FIG. 4c shows the output 400c of a third stage of a process according to the method set out above in relation to FIG. 3. In the output 400c, a virtual object, in this case, a tree 440 has been inserted into the output 400c. The tree 440t, whilst not shown in FIG. 4c, has been modified such that the branches are moving in accordance with the wind direction and magnitude obtained earlier in the method as described above in relation to FIG. 4a. Similarly, the analysis of the environmental conditions undertaken on the real-world objects in the field-of-view, in this case, the flag on the flagpole 420f, enable other features to be inserted into the output 400c. For example, the direction of the light source 410 has been determined from the shadow 420s associated with the flag on the flagpole 420f. This information enables a shadow 440s to be inserted into the output 400c which provides the illusion that the tree 440t forms part of the real-world environment. When the device moves, the anchor point 430 described above in relation to FIG. 4b ensures that the virtual object remains in the same relative position. As a result of the movement, the direction of the light source 410 may also change, and as such the shadow 440s will be adjusted to maintain the illusion that the tree 440*t* forms part of the real-world environment.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising the steps of:
    obtaining an output of an image sensor, the output being representative of a real-world environment comprising at least one real-world object;
    determining, based on the at least one real-world object within the output, information representative of at least one weather condition;
    inserting a virtual object into the output representative of the real-world environment;
    analyzing the information representative of the at least one weather condition using a neural network to determine meta data representative of at least one modification to the virtual object;
    modifying the virtual object using the meta data, such that the virtual object will appear to be affected by the at least one weather condition;
    preparing the at least one modified virtual object for display; and
    displaying the modified virtual object on a display.

2. The method according to claim 1, wherein the information representative of at least one weather condition comprises any of:
    wind direction and magnitude; and
    whether it is raining, hailing, or snowing.

3. The method according to claim 1, wherein the information representative of at least one weather condition is based on a predefined region of the output of the image sensor.

4. The method according to claim 3, comprising obtaining information representative of at least one weather condition for a plurality of predefined regions to determine a plurality of modifications to apply to the at least one virtual object.

5. The method according to claim 1, wherein the information representative of at least one weather condition further comprises depth information obtained from a depth sensor, mono-depth convolutional neural network, or microphone.

6. The method according to claim 5, wherein the step of analyzing further comprises using the depth information to determine whether the virtual object is partially obscured.

7. A device comprising:
    an image sensor for capturing a representation of a real-world environment comprising at least one real-world object;
    a display interface for outputting the representation to a display; and
    at least one processor for modifying a virtual object; the processor arranged to:
        determine, based on the at least one real-world object within the output, information representative of at least one weather condition;
        insert the virtual object into the representation of the real-world environment;
        analyze the information representative of the at least one weather condition using a neural network to determine meta data representative of at least one modification to the virtual object;
        modify the virtual object using the meta data, such that the virtual object will appear to be affected by the at least one weather condition; and
        provide the modified virtual object to a display controller for outputting to the display.

8. The device of claim 7, wherein the at least one processor is any of an image signal processor, a neural processing unit, a central processing unit, and a digital signal processor.

9. The device of claim 7, further comprising a depth sensor for obtaining depth data associated with the real-world environment.

10. The device of claim 7, wherein the information representative of the at least one weather condition comprises any of:
    wind direction and magnitude; and
    whether it is raining, hailing or snowing.

11. The device of claim 7, wherein the processor is further arranged to obtain depth data from the representation of the real-world environment.

12. The device of claim 7, further comprising storage for storing the information representative of at least one weather condition.

13. The device of claim 7, wherein the processor determines the information representative of at least one weather condition based on a predefined region of the representation.

14. The device of claim 7, wherein the display is a head-mounted display.

15. The device of claim 7, wherein the display is a transparent display.

16. A non-transitory computer readable storage medium comprising a set of computer-readable instructions stored thereon which, when executed by at least one processor, cause the at least one processor to:
    obtain an output of an image sensor, the output being representative of a real-world environment comprising at least one real-world object;
    determine, based on the at least one real-world object within the output, information representative of at least one weather condition;
    inserting a virtual object into the output representative of the real-world environment;
    analyze the information representative of the at least one weather condition using a neural network to determine meta data representative of at least one modification to the virtual object
    modify the virtual object using the meta data, such that the virtual object will appear to be affected by the at least one weather condition;
    preparing the at least one modified virtual object for display; and
    display the modified virtual object on a display.

* * * * *